June 3, 1958 H. LANG 2,837,068
DIESEL ENGINE
Filed Jan. 13, 1956 5 Sheets-Sheet 1
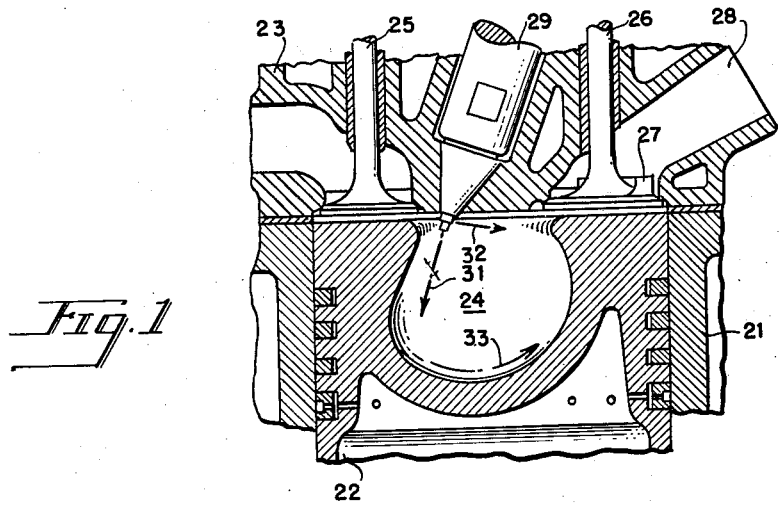
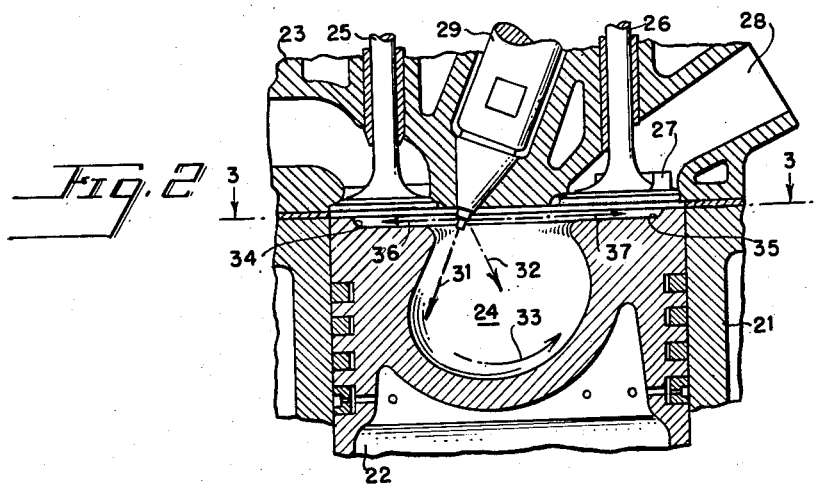
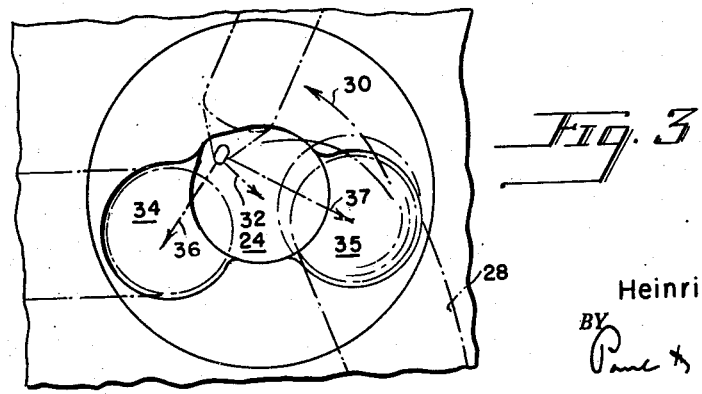
INVENTOR.
Heinrich Lang
BY
ATTORNEY June 3, 1958   H. LANG   2,837,068
DIESEL ENGINE
Filed Jan. 13, 1956   5 Sheets-Sheet 2

INVENTOR.
Heinrich Lang
BY
ATTORNEY

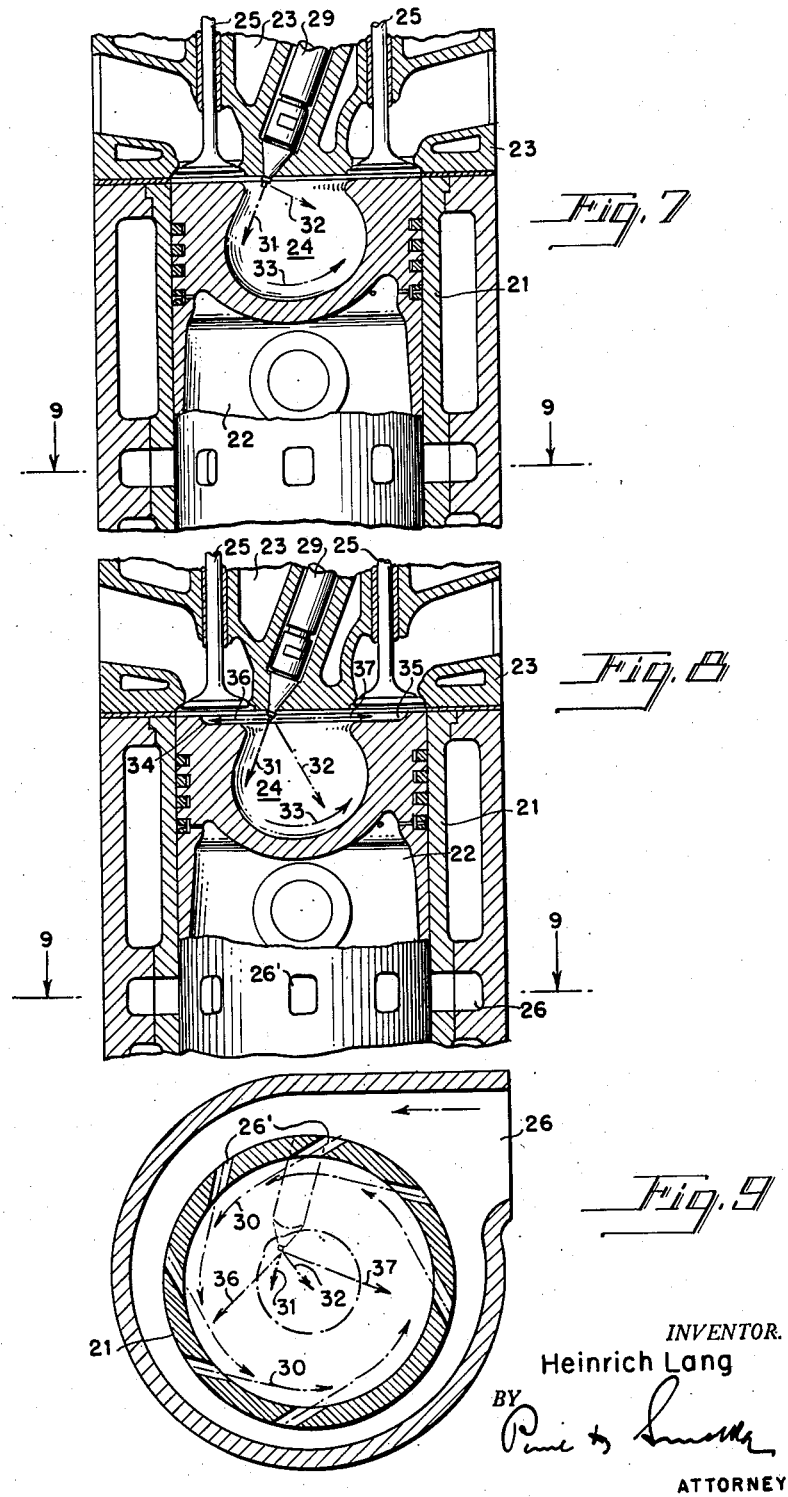

June 3, 1958 H. LANG 2,837,068
DIESEL ENGINE
Filed Jan. 13, 1956 5 Sheets-Sheet 4
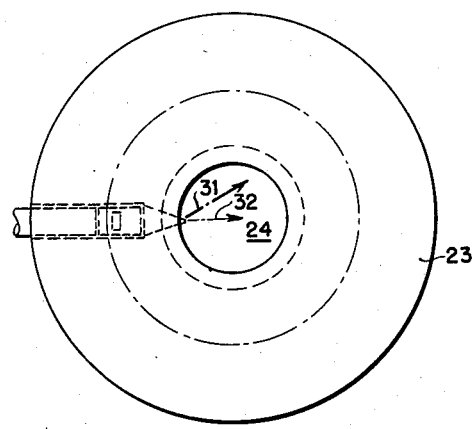
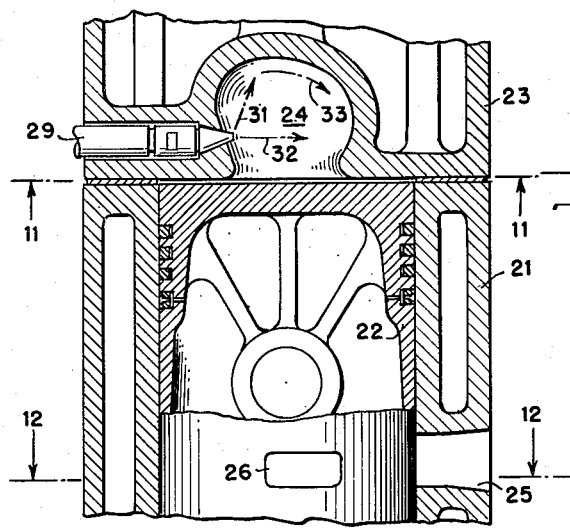
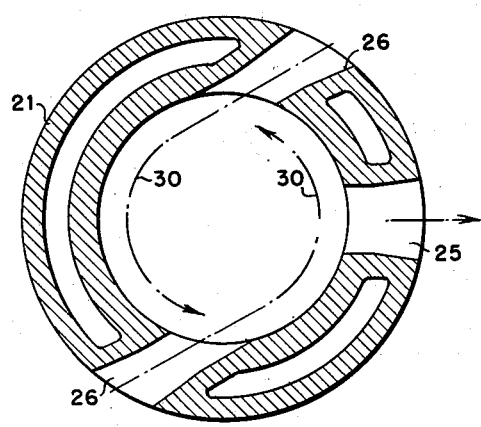
INVENTOR.
Heinrich Lang
BY
ATTORNEY June 3, 1958 H. LANG 2,837,068
DIESEL ENGINE
Filed Jan. 13, 1956 5 Sheets-Sheet 5
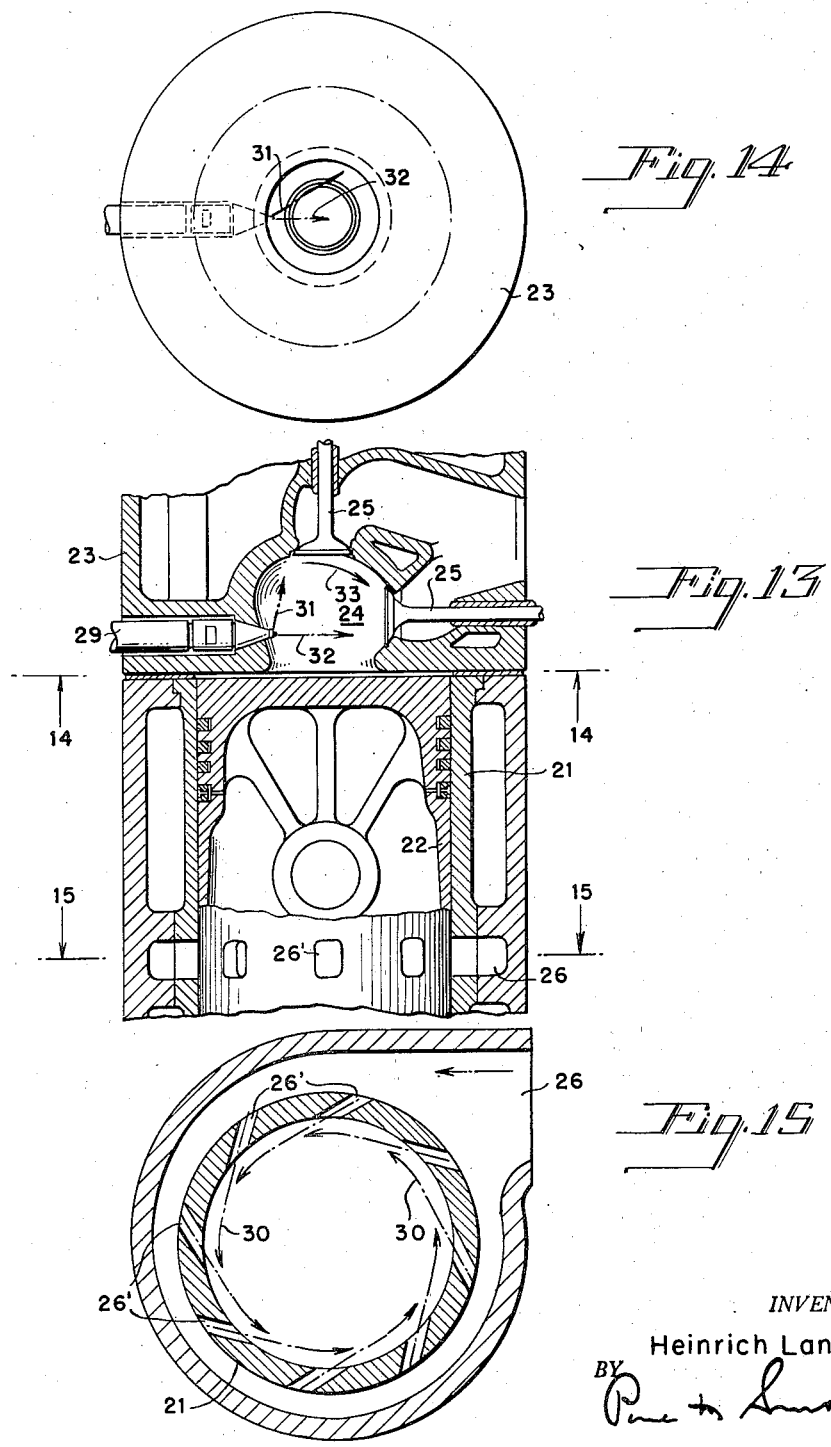
INVENTOR.
Heinrich Lang
BY
ATTORNEY

United States Patent Office 2,837,068
Patented June 3, 1958

2,837,068
DIESEL ENGINE

Heinrich Lang, Munich, Germany, assignor to Durex, S. A., Geneva, Switzerland, a corporation of Switzerland Application January 13, 1956, Serial No. 559,031

4 Claims. (Cl. 123—32)

My invention relates to diesel engines and more particularly to diesel engines of that type in which an injection nozzle mounted in the cylinder head injects fuel directly into an open combustion chamber which communicates with the cylinder space and is located either in the cylinder head or in the piston.

The known diesel engines of that type have many disadvantages; particularly they have a low fuel economy and are not sufficiently smooth in operation mainly in starting the engine in cold weather. Also, they are not sufficiently flexible, i. e. do not permit changes of the operational range between low and high revolutions without excessive smoke development and considerable knocking.

The main object of my invention is to avoid the said disadvantages by improving fuel economy and starting conditions without loss of horsepower and flexibility and by avoiding undesirable knocking, and noise and smoke development.

According to my invention my new diesel engine comprises an open combustion chamber of substantially rotational symmetry arranged either in the cylinder head or in the piston coaxially with the engine cylinder, the opening of said chamber leading into the cylinder space having a clearance substantially not larger than the largest section of said chamber taken at least approximately perpendicularly to the axis of the cylinder, and a multispray fuel injection nozzle having in its tip positioned close to the border of said chamber opening at least one primary orifice adapted to eject a fuel jet of strong penetrating power substantially along the wall of said chamber and inclined to the plane of said opening in the direction of the swirl of the air entering the cylinder, and at least one secondary orifice adapted to eject a fuel jet of weaker penetrating power towards and into the relatively stagnant portion of the air charge assembled centrally in the combustion chamber in and around its axis.

The said and other objects of my invention will be more fully understood from the following specification when read with the accompanying drawing wherein several embodiments of my invention are illustrated.

In the drawing—

Fig. 1 shows a longitudinal sectional view of one embodiment including a combustion chamber in the crown of the piston and inlet and exhaust valves in the cylinder head;

Figs. 2 and 3 illustrate a modified second embodiment, Fig. 2 showing a longitudinal sectional view and Fig. 3 a top view seen as indicated by arrows 3 of Fig. 2; parts mounted in the cylinder head being indicated by dotted lines;

Figs. 7 and 8 show a longitudinal sectional view of a fifth and sixth embodiment, respectively, each including a combustion chamber in the crown of the piston, exhaust valves in the cylinder head and inlet ports controlled by the piston.

Fig. 9 shows a cross sectional view along line 9—9 of Fig. 7 or 8;

Figure 4:
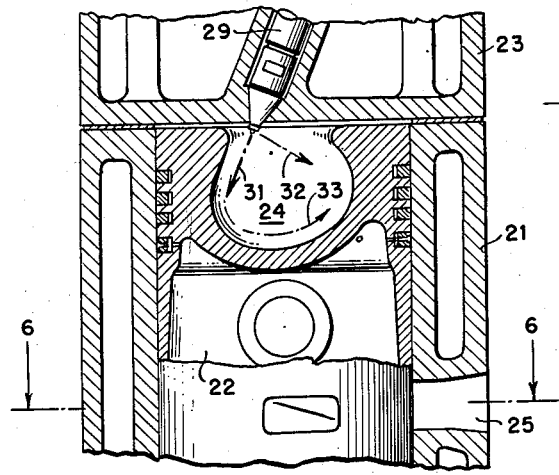
Figs. 4 and 5 show a longitudinal sectional view of a third and of a fourth embodiment, respectively, each including a combustion chamber in the crown of the piston and inlet and exhaust ports controlled by the piston.

Figs. 10, 11 and 12 illustrate a seventh embodiment including a combustion chamber in the cylinder head, and inlet and exhaust ports controlled by the piston, Fig. 10 showing a longitudinal sectional view, Fig. 11 a bottom view of the cylinder head seen in the direction of arrow 11 of Fig. 10, and Fig. 12 a cross sectional view along line 12—12 of Fig. 10;

Figs. 13, 14 and 15 illustrate an eighth embodiment including a combustion chamber with exhaust valves in the cylinder head and inlet ports controlled by the piston, Fig. 13 showing a longitudinal sectional view, Fig. 14 a bottom view of the cylinder head seen in the direction of arrow 14 of Fig. 13, and Fig. 15 a cross sectional view along line 15—15 of Fig. 13.

The same reference characters indicate the same or equivalent parts in all figures of the drawing.

The embodiment of the diesel engine illustrated in Fig. 1 comprises an engine cylinder 21, a piston 22 reciprocating therein and a cylinder head 23. In the piston 22 is an open combustion chamber 24 which communicates with the cylinder space and which is at least nearly rotationally symmetrical and substantially coaxial with piston 22 and cylinder 21. The mouth of said chamber 24 may be restricted as shown; in any case, however, the mouth clearance should not be wider than the largest section of said chamber taken perpendicularly to the cylinder axis.

The cylinder head 23 houses at least one exhaust valve 25, at least one air inlet valve 26 and a fuel injection nozzle 29 which has a plurality of orifices to deliver into the combustion chamber 24 at least one principal fuel jet 31 of such strong power to penetrate to or near to the bottom of the combustion chamber flowing substantially along the wall thereof and at least one secondary jet 32 having a more or less weaker penetrating power, delivering fuel into an inner or more centrally located portion of the combustion chamber. In the case of more than one secondary jet each of them may have a different penetrating power in accordance with the relative distance of that respective portion of the combustion chamber to be supplied with fuel by the respective jet.

The engine is provided with known means to impart a revolving movement or swirl to the incoming combustion air so that the injected fuel will better mix therewith and burn as complete as possible. In the embodiment shown in Fig. 1 this means consist of an inlet valve 26 provided with a mask or deflector 27 which effects the air incoming through the duct 28 to flow tangentially to the cylinder 21 and slightly downward as indicated by arrow 30 in Fig. 3. Instead of using the shown masked inlet valve 26 the air inlet duct 28 may be so disposed in known manner that it imparts an air flow in a direction tangential to the cylinder and slightly downward. It will be well understood that the said revolving movement or swirl of the air is being maintained in the cylinder 21, and during the compression stroke also in the combustion chamber 24 up to ignition, and that the peripheral portions of the swirling air column will move faster than the core portions thereof which in fact in and near the swirl axis which is coincident with the cylinder axis will remain at least practically at rest. And it will be further understood that the said peripheral portions of the swirling air column flowing along the wall of the cylinder 21 and of the combustion chamber 24 will be cooled off whereas the practically stationary core of the swirling air column will retain its heat.

The injection nozzle 29 is so mounted in the cylinder head 23 that the main fuel jet 31 emanating therefrom in axial direction enters the combustion chamber 24 close to the border of the chamber mouth tangentially to the wall of said chamber and in a slanting direction conforming to the revolving direction of the air charge thus pushing the revolving peripheral portion of the air charge along the wall of said chamber as indicated by arrow 33 in Fig. 1.

According to my invention the orifice for the said secondary fuel jet 22 or each of a plurality of such orifices is so located in the tip of the nozzle 19 that the secondary fuel jet enters that portion of the air charge in the combustion chamber 24 which, as explained above, at least practically did not partake in said swirling motion and in said additional motion resulting from the entry of the primary fuel jet 31 and which did not suffer any loss of heat by contact with the walls of the cylinder 21 and of the combustion chamber 24. As shown in Fig. 1 the lateral secondary jet 32 enters the portion of air contained in the space between the borders of the mouth of the chamber 24. This air portion entered the said chamber at the very end of the compression stroke, did not come into contact with the walls of the engine, has hardly, if at all, participated in the revolving motion of the air and has been detained from mixing with the peripheral air portions in the cylinder and in said chamber; therefore said air portion retained its heat. Thus the lateral jet or jets 32 entering the said not cooled off portion of the air charge in the combustion chamber 24 will be safely ignited even in cold weather, in fact will ignite prior to the primary fuel jet or jets 31 and will assure a complete combustion of the injected fuel under all conditions. The said lateral jet or jets 32 are blown more or less downwardly into the center of the air portion assembled between the borders of the mouth of the chamber 24 as shown in Fig. 1, radially to the cylinder or in or against the direction of the revolving movement or swirl of the air.

In the embodiment shown in Figs. 2 and 3 which is substantially identical with the embodiment shown in Fig. 1 the crown of the piston 22 is provided with depressions which form pockets 34, 35 opposite the exhaust and inlet valves 26, 27, respectively, said pockets communicating with the mouth of combustion chamber 24. The tip of the injection nozzle 29 is provided with at least two additional orifices each of which ejects a tertiary fuel jet 36, 37, respectively, substantially within a plane perpendicular to the cylinder axis into one of said pockets 34, 35, to utilize the hot compressed air assembled therein. The lateral secondary fuel jet 32 is arranged to penetrate through the air portion assembled in the mouth of the combustion chamber into the core of the air charge in said chamber.

Figure 5:
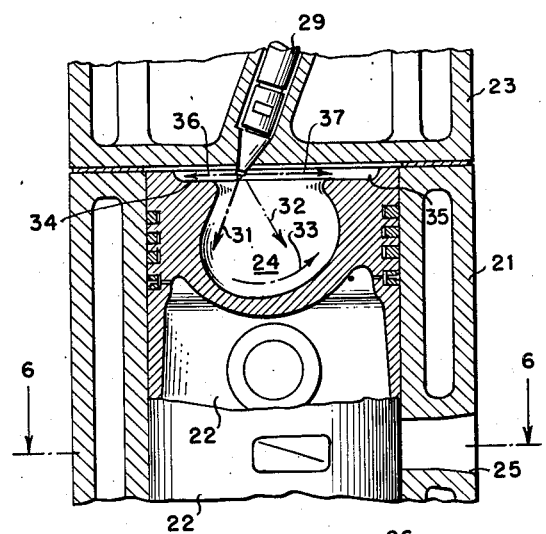
Figure 6:
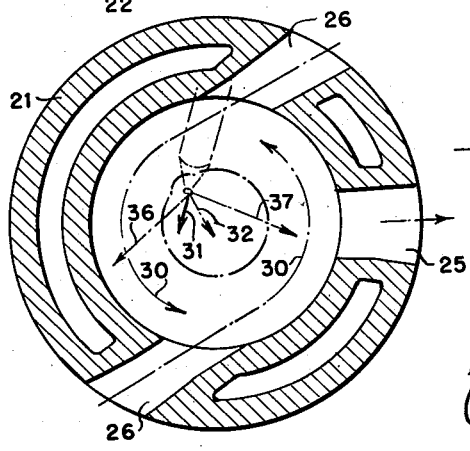
Fig. 6 shows a cross-sectional view along line 6—6 of Fig. 4 or 5.

The two embodiments of my diesel engine illustrated in Figs. 4, 5, and 6 comprise an engine cylinder 21 with air inlet ports 26 and exhaust port 25 which ports are controlled by the piston 22. The inlet ports 26 lead more or less tangentially into the space of the cylinder 21 to impart to the incoming air a revolving movement or swirl as indicated by arrows 30. Otherwise these two embodiments will operate in the same manner as the embodiments illustrated in Figs. 1 and 2, respectively, and fully described above.

The two embodiments of my diesel engine illustrated in Figs. 7, 8, and 9 comprise an engine cylinder 21 with air inlet ports 26' and exhaust valves 25 in the cylinder head 23. The inlet ports 26' which are controlled by the piston 22 connect the air duct 26 with the cylinder space and lead more or less tangentially thereinto to impart to the inflowing air a revolving movement or swirl as indicated by arrows 30 in Fig. 9. Otherwise these two embodiments will operate in the same manner as the embodiments illustrated in Figs. 1 and 2, respectively, and fully described above.

In the embodiment shown in Figs. 10, 11 and 12 the cylinder 21 is provided with inlet ports 26 and exhaust ports 25 which are controlled by the piston 22. Again the inlet ports 26 lead more or less tangentially into the cylinder space to impart a swirl to the inflowing air as indicated by arrows 30. The combustion chamber of substantially rotational symmetry is arranged in the cylinder head 23 coaxially with the cylinder 21 and opens with a restricted mouth into the cylinder. The injection nozzle 29 is mounted in the cylinder head 23 and the tip of said nozzle enters the combustion chamber 24 near its open mouth. This tip of the nozzle 29 is provided with at least one orifice delivering a primary fuel jet 31 which flows substantially along the wall of the combustion chamber 24 and has such strong power to penetrate to or near to the dome shaped top of said chamber, and with at least one secondary orifice delivering a fuel jet 32 of more or less weaker power to penetrate into the more centrally located portion of said combustion chamber. The operation of this embodiment will be fully understood from the foregoing detailed description of the embodiments shown in Figs. 1 and 2.

In the embodiments illustrated in Figs. 13, 14 and 15 the cylinder 21 is provided with inlet ports 26' as described above with reference to Figs. 7, 8, 9. The combustion chamber 24 is arranged in the cylinder head 23 and the injection nozzle 29 is located relative thereto as described above with reference to Figs. 10, 11, 12. The exhaust valves 25 open into the combustion chamber 24 as shown. The operation of this embodiment will be easily understood from the preceding description of the embodiments shown in Figs. 1, 2, 3, Figs. 7, 8, 9, and Figs. 10, 11, 12, respectively.

While specific embodiments of my invention have been shown and described in detail to illustrate the application of the principles of my invention it will be well understood that my invention may be otherwise embodied without departing from such principles and without avoiding the appended claims.

What I claim as my invention is:

1. A diesel engine comprising in combination an engine cylinder; a piston reciprocating therein; a cylinder head; an open combustion chamber of substantially rotational symmetry and coaxial with the cylinder; the opening of said combustion chamber leading into the cylinder and having a clearance substantially not larger than the largest section of said chamber taken at least approximately perpendicularly to the axis of the cylinder; at least one air inlet; means to impart a revolving movement or swirl to the air entering the engine cylinder through said inlet; an injection nozzle mounted in the cylinder head; the tip of said nozzle being located at least substantially within the said opening of the combustion chamber and close to the border thereof; at least one primary orifice in said tip adapted to eject a main fuel jet of strong penetrating power into said combustion chamber substantially along the side wall thereof and in a direction away from said opening toward the bottom of the combustion chamber; and at least one secondary orifice in said tip adapted to eject an auxiliary fuel jet of weaker penetrating power into the at least relatively stagnant core of the air charge in said combustion chamber so that said auxiliary fuel jet enters such portion of the air charge which has not been cooled off by the walls of the combustion chamber.

2. A diesel engine according to claim 1 wherein the combustion chamber is arranged in the piston coaxially therewith.

3. A diesel engine according to claim 1 wherein the combustion chamber is arranged in the cylinder head.

4. A diesel engine according to claim 1 wherein the combustion chamber is arranged in the piston coaxially therewith and comprising a depression or pocket in the crown of the piston, said depression containing the said opening of the combustion chamber, and at least one tertiary orifice in the tip of the nozzle adapted to eject a fuel jet into said depression.

References Cited in the file of this patent

UNITED STATES PATENTS

| 2,720,870 | Grob | Oct. 18, 1955 |

FOREIGN PATENTS

| 625,948 | Great Britain | July 6, 1949 |
| 72,509 | Netherlands | June 15, 1953 |
| 1,067,634 | France | Jan. 27, 1954 |